March 17, 1953     R. M. PERRY ET AL     2,631,563
TOOL FOR INJECTING SEALING COMPOUND
Filed June 29, 1951
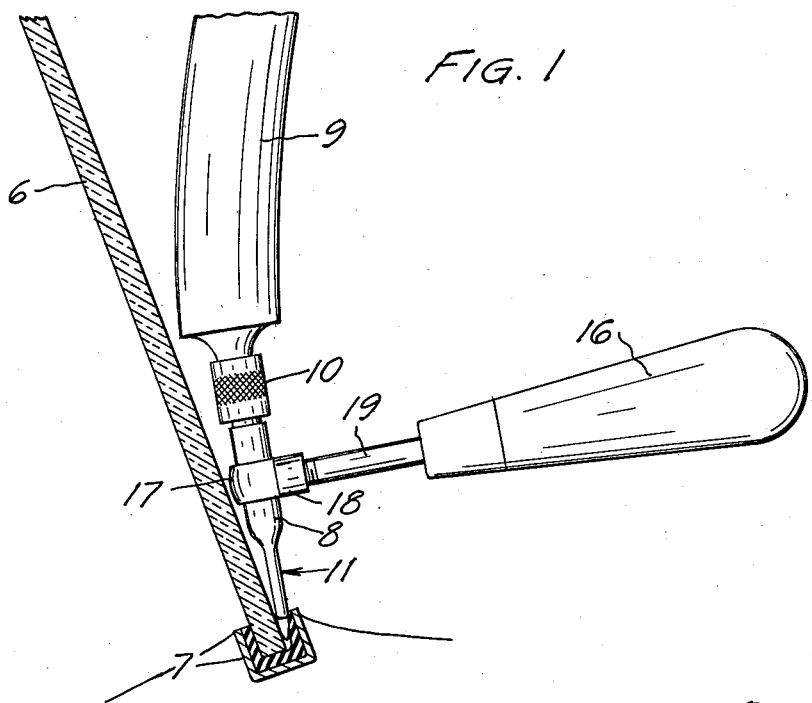
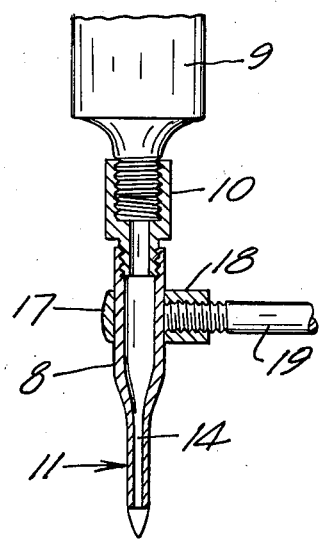
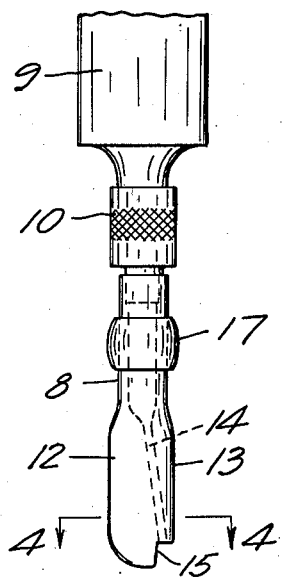
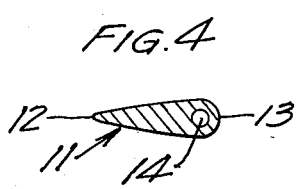
INVENTORS
RAY M. PERRY
RAYMOND F. PERRY
BY Williamson & Williamson
ATTORNEYS Patented Mar. 17, 1953

2,631,563

UNITED STATES PATENT OFFICE 2,631,563

TOOL FOR INJECTING SEALING COMPOUND

Ray M. Perry and Raymond F. Perry,
Minneapolis, Minn.

Application June 29, 1951, Serial No. 234,418

1 Claim. (Cl. 118—72)

This invention relates to a device for facilitating the injection of fluid material between a pair of engaged elements, at least one of which is yieldable and somewhat resilient.

The resilient rubber sealing gasket formed around the windshield and rear windows of an automobile often permits water to leak therethrough and it is frequently necessary to inject sealing material between said rubber gasket and the glass surface normally engaged therewith. This has been a serious problem since it is difficult to separate the resilient sealing gasket from the window surface simultaneously with the injection of sealing fluid therebetween.

It is an object of our invention to provide a tool for greatly facilitating the injection of a sealing fluid between the rubber sealing gaskets surrounding an automobile windshield or the like and the engaged glass surface to simultaneously separate the gasket from the glass while injecting the sealing fluid therebetween.

It is another object to provide a device having a relatively flat blade portion somewhat thinner at the leading edge thereof than at the trailing edge thereof with a fluid conducting passage formed therein with its discharge opening disposed in spaced relation rearwardly from the leading edge of said blade and upwardly from the lower end thereof to facilitate simultaneous separation of a rubber sealing element from the surface of the glass engaged thereby.

It is still a further object to provide a device for facilitating injection of sealing fluid between a pair of engaged elements, at least one of which is yieldable and somewhat resilient, said device being adapted to be attached to a sealing fluid container and having a flat blade portion at the lower end thereof with a fluid passage therethrough communicating with said container and permitting the angular relation of said blade to be adjusted relative to a gripping handle attached thereto.

These and other objects and advantages of our invention will more fully appear from the following description made in connection with the accompanying drawings wherein like reference characters refer to similar parts throughout the several views and in which:

Fig. 1 is a view partially in section and partially in side elevation, showing our improved tool in operative position for injecting fluid material between the rubber gasket and the peripheral marginal portion of a windshield glass;

Fig. 2 is a side elevational view of our improved tool;

Fig. 3 is a vertical sectional view taken substantially through the fluid conveying passage shown by dotted lines in Fig. 2;

Fig. 4 is a transverse vertical sectional view taken substantially along the line 4—4 of Fig. 2.

As illustrated in the accompanying drawings, we provide a tool particularly designed to facilitate injection of sealing material between a pair of engaged elements, such as the windshield of an automobile, as indicated at 6 of Fig. 1 and the rubber sealing gasket 7 surrounding the marginal peripheral portion thereof. In order to inject the sealing material between any such elements, it is of course necessary that one of these elements be yieldable and somewhat resilient.

In the form shown, our device consists in a cylindrical hollow shank portion 8 having means at the upper end thereof for connection with a sealing fluid container, such as the compressible tube 9. In the form shown, this attachment constitutes an internally threaded portion at the upper end of shank 8 to which, in the form shown, an adapter 10 is threadably connected. The upper end of adapter 10 is of course internally threaded to receive the tube 9 or of course any other suitable means may be provided for connecting the fluid container with the fluid conveying passage within shank 8.

A relatively flat blade is formed at the lower end of the shank 8 and is designated by the numeral 11. The fluid passage diminishes somewhat in size and extends downwardly into the blade 11. The blade has a thin leading edge 12 and a thickened trailing edge 13, as best shown in Fig. 4. The fluid passage designated by the numeral 14 through the blade has its discharge opening in upwardly spaced relation from the lower end of the blade and in rearwardly spaced relation from the leading edge 12 thereof. A fluid access recess 15 is formed at the lower rear corner of the blade and the discharge opening from passage 14 is disposed in the upper portion thereof. The peripheral edge portion of recess 15 intersects the side blade surfaces to form a sharp corner around the periphery of the recess and thereby tend to hold the resilient sealing element in spaced relation to the glass adjacent the discharge opening from passage 14.

The handle 16 is connected with the shank 8 as by a sleeve 17 having a boss 18 with an internally threaded set screw passage therethrough to receive a set screw 19 fixed to the handle 16. This set screw attachment between the handle and the shank permits the relative angulation between the blade and the handle to be adjustably varied for the convenience of the operator.

In the operation of our tool, a flexible tube, such as the tube 9, may be attached to the top of shank 8 as by being threadably connected therewith, as shown in the accompanying drawing, and the desired angulation between the blade 11 and the handle 16 is obtained by loosening the set screw 19 and rotating the shank 8 within sleeve 17 when subsequently tightening the set screw 19 against said shank. The thin leading edge of the knife 11 is inserted between the gasket 7 and the glass 6 and holds the resilient gasket in spaced relation from the glass to permit sealing material to be forced from the tube 9 through the passage 14 and out through the discharge opening at recess 15. The sealing fluid will fill the space between the gasket 7 and the adjacent portion of the glass 6 so that as the tool is moved along between the glass and the gasket the gasket will return into engagement with the glass and press the excess sealing material out from between the two elements while maintaining the proper amount therebetween to tightly seal the periphery of the glass. It should be noted that any suitable source of fluid under pressure can be easily connected with our device and the tube 9 is only a convenient means of showing such a source.

It will be seen that we have provided an extremely simple, yet highly efficient, tool constructed to greatly facilitate the injection of sealing fluid between a pair of engaged elements, at least one of which is yieldable and at least slightly resilient. It is particularly adapted for use in injecting sealing compound between the gaskets surrounding automobile windshields and rear windows and the engaged glass surfaces and is of course primarily intended for this purpose. The thin leading edge 12 of the blade 11 is easily insertable between the gasket and the glass and the thickened trailing edge portions hold the gasket in separated relation from the glass to permit the sealing fluid to be inserted therebetween. The angular relation between the blade and the handle may of course be adjusted by the set screw arrangement on the shank 8 and the injection of the sealing fluid is greatly facilitated by the use of our tool.

It will, of course, be understood that various changes may be made in the form, details, arrangement and proportions of the parts without departing from the scope of our invention.

What we claim is:

A device for facilitating injection of fluid sealing material between a pair of engaged elements, at least one of which is flexible, said device comprising a cylindrical shank portion having a fluid passage extending therethrough, means at the upper end of said shank for attachment of a fluid container, a sleeve rotatably received about said cylindrical shank portion, a set screw threadably received through a portion of said sleeve and having a gripping handle fixed thereto, a relatively flat blade member formed at the lower portion of said cylindrical shank and having a fluid passage therein communicating with the fluid passage of said shank, the leading edge of said blade being relatively thin and the trailing edge thereof being somewhat thicker to progressively spread two elements between which said blade is inserted, said passage having a discharge opening disposed in upwardly spaced relation to the bottom end of said blade and in rearwardly spaced relation to the leading edge thereof, said set screw permitting the angular relation between said blade and said handle to be adjustably varied.

RAY M. PERRY.
RAYMOND F. PERRY.

REFERENCES CITED

The following references are of record in the file of this patent:

UNITED STATES PATENTS

| Number | Name | Date |
|---|---|---|
| 1,419,210 | Bradford | June 13, 1922 |
| 2,130,009 | Hazelip | Sept. 13, 1938 |
| 2,518,273 | Bergstrom | Aug. 8, 1950 |

FOREIGN PATENTS

| Number | Country | Date |
|---|---|---|
| 484,120 | Great Britain | May 2, 1938 |